United States Patent
Green

(10) Patent No.: US 6,807,485 B1
(45) Date of Patent: Oct. 19, 2004

(54) INTEGRATED POSITION AND DIRECTION SYSTEM WITH RADIO COMMUNICATION FOR UPDATING DATA

(75) Inventor: James Green, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/437,351

(22) Filed: May 12, 2003

Related U.S. Application Data

(63) Continuation of application No. 09/912,110, filed on Jul. 23, 2001, now Pat. No. 6,587,788, which is a continuation-in-part of application No. 09/614,392, filed on Jul. 12, 2000, now Pat. No. 6,353,798.

(51) Int. Cl.[7] .............................. G01C 21/00; G01S 3/02
(52) U.S. Cl. .................. 701/213; 701/300; 340/995.24; 342/357.09
(58) Field of Search ................................ 701/213, 216, 701/300, 211; 342/357.06, 357.13, 357.14, 357.09; 340/995.12, 995.24, 995.27

(56) References Cited

U.S. PATENT DOCUMENTS

| | | | | |
|---|---|---|---|---|
| 5,528,518 A | * | 6/1996 | Bradshaw et al. | ......... 702/150 |
| 5,699,056 A | * | 12/1997 | Yoshida | ....................... 340/905 |
| 6,150,961 A | * | 11/2000 | Alewine et al. | ......... 340/995.1 |
| 6,321,158 B1 | * | 11/2001 | DeLorme et al. | ........... 701/201 |
| 6,337,641 B1 | * | 1/2002 | Yoshioka et al. | ........... 340/989 |
| 6,360,167 B1 | * | 3/2002 | Millington et al. | ......... 701/211 |
| 6,381,603 B1 | * | 4/2002 | Chan et al. | ................... 707/10 |
| 6,553,310 B1 | * | 4/2003 | Lopke | ........................ 701/213 |

* cited by examiner

Primary Examiner—Michael J. Zanelli

(57) ABSTRACT

An integrated position and direction system is disclosed that includes a digital compass, a communication module, and a satellite positioning system having a receiver adapted to receive satellite position determining signals. Signals that are received from satellites are used to determine position of the integrated position and direction system. A method for updating data is disclosed in which the integrated position and direction system communicates with a remote site and sends a determined position to the remote site. A response is generated and is transmitted to the integrated position and direction system that includes data relating to features located near the determined position. The received data is used to generate a display that indicates the position and the orientation of the features relative to the integrated position and direction system.

18 Claims, 18 Drawing Sheets

INTEGRATED POSITION AND DIRECTION SYSTEM WITH RADIO COMMUNICATION FOR UPDATING DATA

CROSS REFERENCE TO RELATED APPLICATION

This is a continuation of application Ser. No. 09/912,110 filed on Jul. 23, 2001, now U.S. Pat. No. 6,587,788 which is hereby incorporated by reference to this specification, which is a Continuation-in-Part of commonly-owned U.S. patent application Ser. No. 09/614,392, filed Jul. 12, 2000, now U.S. Pat. No. 6,353,798, by J. Green et al., and entitled "INTEGRATED POSITION AND DIRECTION SYSTEM WITH THREE-SENSOR DIGITAL COMPASS".

TECHNICAL FIELD

This invention relates to position determination systems. Specifically, the present invention relates to an apparatus and a method for updating data.

BACKGROUND ART

Satellite positioning system (SATPOS) devices that determine position using the satellites of the US Global Positioning System (GPS) are commonly used for navigation of vessels; vehicles; airplanes, and other conveyances. SATPOS devices are also used for surveying, construction site planning and management, mining, oil and gas exploration and development, etc. Also, handheld SATPOS devices are used for personal navigation, data collection, data maintenance, etc.

SATPOS devices are quite effective for indicating the position of the SATPOS device. Position is typically indicated using either an alphanumeric indication of position or by displaying a map that indicates position. Alphanumeric indications of position typically include coordinates such as, for example, Latitude and Longitude, World Geodetic Survey (WGS) Coordinates, etc.

Map displays typically indicate position by an icon or other indicator visible on a map. One such map display, typically referred to as a moving map display, displays the position of the SATPOS in the center of the displayed map. Such map displays typically are oriented such that the top of the SATPOS device's display indicates North (either magnetic North or true North). That is, irrespective of the direction In which the SATPOS device is actually oriented, North is shown at the top of the display. For users that intuitively know which direction is North, such maps are adequate for locating features displayed on the map. However, for users that do not know where North is, or when visibility is obscured such that the user cannot determine where North is, such maps are inadequate for guiding the user to a destination or to a feature displayed on the map.

For many commercial applications of SATPOS systems, such as construction site planning and management, surveying, navigation, etc., it is essential that an operator be able to locate features displayed on the map. Such users typically operate a separate device for indicating direction such as a conventional magnetic compass.

Some SATPOS devices indicate the direction of movement of the SATPOS device, typically referred to as "heading." Typically, heading is determined by analysis of determined position in relation to prior determinations of position as the SATPOS moves. Typically, SATPOS devices that indicate heading use a map display oriented such that the top of the SATPOS unit (e.g., the top of the unit's display) corresponds to North (either magnetic North or true North).

Some prior art SATPOS devices orient the displayed map such that the top of the SATPOS unit (e.g., the top of the unit's display) corresponds to the direction of movement calculated by the SATPOS device. This gives a good approximation of the user's heading as long as the user continues to move and as long as the SATPOS unit is oriented in the direction of movement, allowing a user to easily determine the location of features visible on the display. However, when the SATPOS device stops moving, determination of heading can no longer be made. Some SATPOS systems maintain the previous heading for orienting the moving map display for a given time interval. Other prior art SATPOS systems default to positioning North at the top of the map. This can be quite confusing to the user.

Recently, digital compasses have been developed that can indicate direction. However, digital compasses must be calibrated to properly align the digital compass prior to use. Also, each time that magnetic environment around the compass changes, the digital compass must be recalibrated. Digital compasses are typically calibrated by moving the digital compass in a full horizontal arc. The calibration process takes time and is prone to operator error. Also, calibration error can occur as a result local magnetic anomalies.

Some applications such as Graphical Information System (GIS) applications, data maintenance applications, etc. require updates to a remote database. In addition, the user needs to be able to determine the location of nearby features for updating information relating to the feature. Some prior art SATPOS devices used in GIS and data maintenance applications store mapping data for an entire geographic region in the memory of the SATPOS device. However, the storage of such large amounts of mapping data on each SATPOS device requires each SATPOS device to have extensive memory storage, adding to the cost of the SATPOS device.

What is needed is a method and apparatus for providing an accurate indication of heading to a user of a SATPOS device. Also, a method and apparatus is needed that meets the above needs and that accurately indicates direction when the SATPOS is not moving. Also, a method and apparatus is needed that can communicate with remote sites and that is easy to use. Moreover, a method and apparatus is needed that allows for updating data in a remote database and allows for easily determining of the location of features located near the SATPOS. The present invention meets the above needs.

DISCLOSURE OF THE INVENTION

The present invention provides an integrated position and direction system that that accurately indicates direction and heading. The integrated position and direction system includes a digital compass for indicating direction when the integrated position and direction system is not moving. In addition, the integrated position and direction system of the present invention includes a communication module for communicating with remote sites. Moreover, the method and apparatus of the present invention allows for updating data in a remote database. Furthermore, the location of nearby features are easily determined.

An integrated position and direction system is disclosed that includes a SATPOS having a receiver adapted to receive satellite position determining signals. The integrated position and direction system of the present invention also includes a digital compass that is adapted to determine direction. In one embodiment, a controller is used to control the operations of the integrated position and direction system.

In one embodiment of the present invention, when the SATPOS is moving, the direction of movement or "heading" determined by the SATPOS is indicated on the display. When the SATPOS is not moving, the direction given by the digital compass is indicated on the display. Therefore, while the SATPOS is moving, the heading is indicated, and when the SATPOS is not moving, direction is indicated using the digital compass. Thus, the present invention provides a method and apparatus for providing an accurate indication of both heading and direction to a user of a SATPOS device.

In one embodiment of the present invention, the integrated position and direction system includes a radio communication module. The radio communication module allows for communication with remote devices and remote sites using wireless communication methods. In the present embodiment, the radio communication module communicates through radio transmissions with a cellular communication system.

Methods for updating data are disclosed in which the integrated position and direction system communicates with a remote site for both uploading and downloading data. Data is downloaded to the integrated position and direction system and is updated such that only data relating to features located near the current position of the position and direction system is downloaded. The received data is then used to generate a display that indicates features located near the integrated position and direction system. The display indicates the orientation and position of the features relative to the integrated position and direction system.

Data in a remote database is updated with user input that is received at the integrated position and direction system. The user input and a determination of position (that represents the position at which the user input was received) are sent to a remote computing device. The user input and the determined position are then used to update the remote database.

Because the display indicates the correct orientation of features, the features are easy to find. Also because the integrated position and direction system of the present invention only downloads data that relates to features located near the current position of the integrated position and direction system, there is no need to store extensive amounts of data on the integrated position and direction system. Thereby, significant cost savings are realized The methods and apparatus of the present invention provide for easily updating data (both data stored on the integrated position and direction system and data stored in a remote database) using a radio communication module that communicates with a remote computing device. The apparatus and methods of the present invention allow for easily updating data in a remote database and allow for easily determining the location of features.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Figure 1:
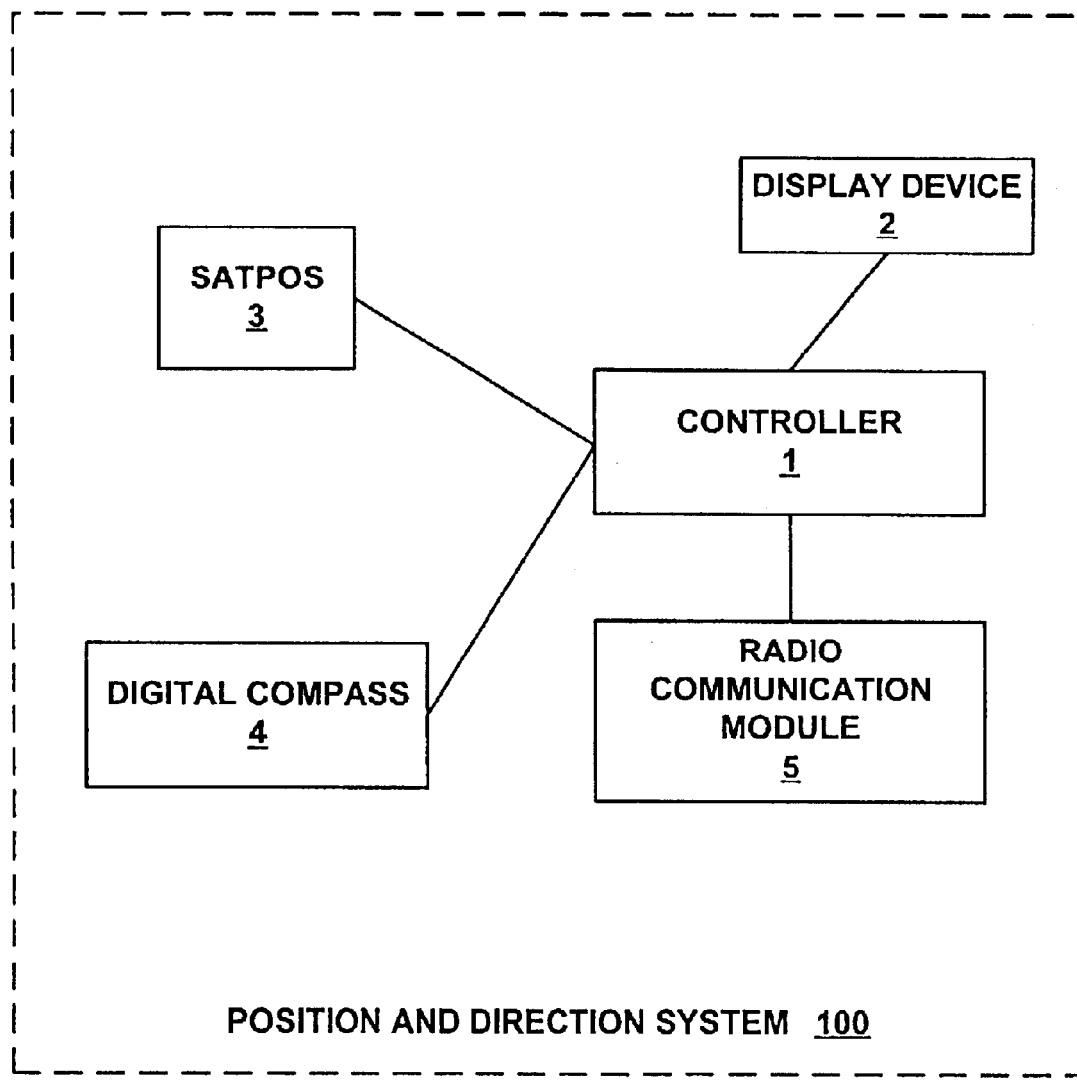
FIG. 1 is a diagram of a position and direction system in accordance with one embodiment of the present claimed invention.

FIG. 1 is a logical representation of components of integrated position and direction system 100 in accordance with one embodiment of the present invention. Integrated position and direction system 100 includes Satellite Positioning System (SATPOS) 3 that is operable for determining position. In one embodiment, SATPOS 3 is adapted to determine position using a Satellite Positioning System such as the US Global Positioning System (GPS).

In operation, SATPOS 3 determines its location by analysis of satellite position determining signals such as signals from satellites of the US GPS. Position signal processing circuitry in SATPOS 3 also determines the direction of movement of SATPOS 3, referred to hereinafter as "heading" and couples the determined heading to controller 1. In the present embodiment, heading is determined by comparing satellite position determining signals received as the integrated position and direction system 100 moves.

Integrated position and direction system 100 of FIG. 1 also includes digital compass 4. Digital compass 4 is operable to determine direction and couple direction to controller 1. More particularly, in the present embodiment, digital compass 4 determines the compass direction that corresponds to the orientation of the integrated position and direction system 100.

Continuing with FIG. 1, controller 1 controls the operation of integrated position and direction system 100. In one embodiment, controller 1 is a general-purpose computer. Alternatively, controller 1 is an integrated circuit device such as a microcontroller or an Application Specific Integrated Circuit (ASIC) device or a Field Programmable Gate Array (FPGA) device. In one embodiment, the functions of controller 1 are performed by a general purpose microprocessor that is operable to execute instructions contained in one or more software program(s).

In the present embodiment, controller 1 is operable to display the determined position and the determined direction and/or heading on display 2. Display device 2 may be a liquid crystal device, flat panel display, or other display device suitable for creating graphic images and alphanumeric characters recognizable to the user.

Figure 2:
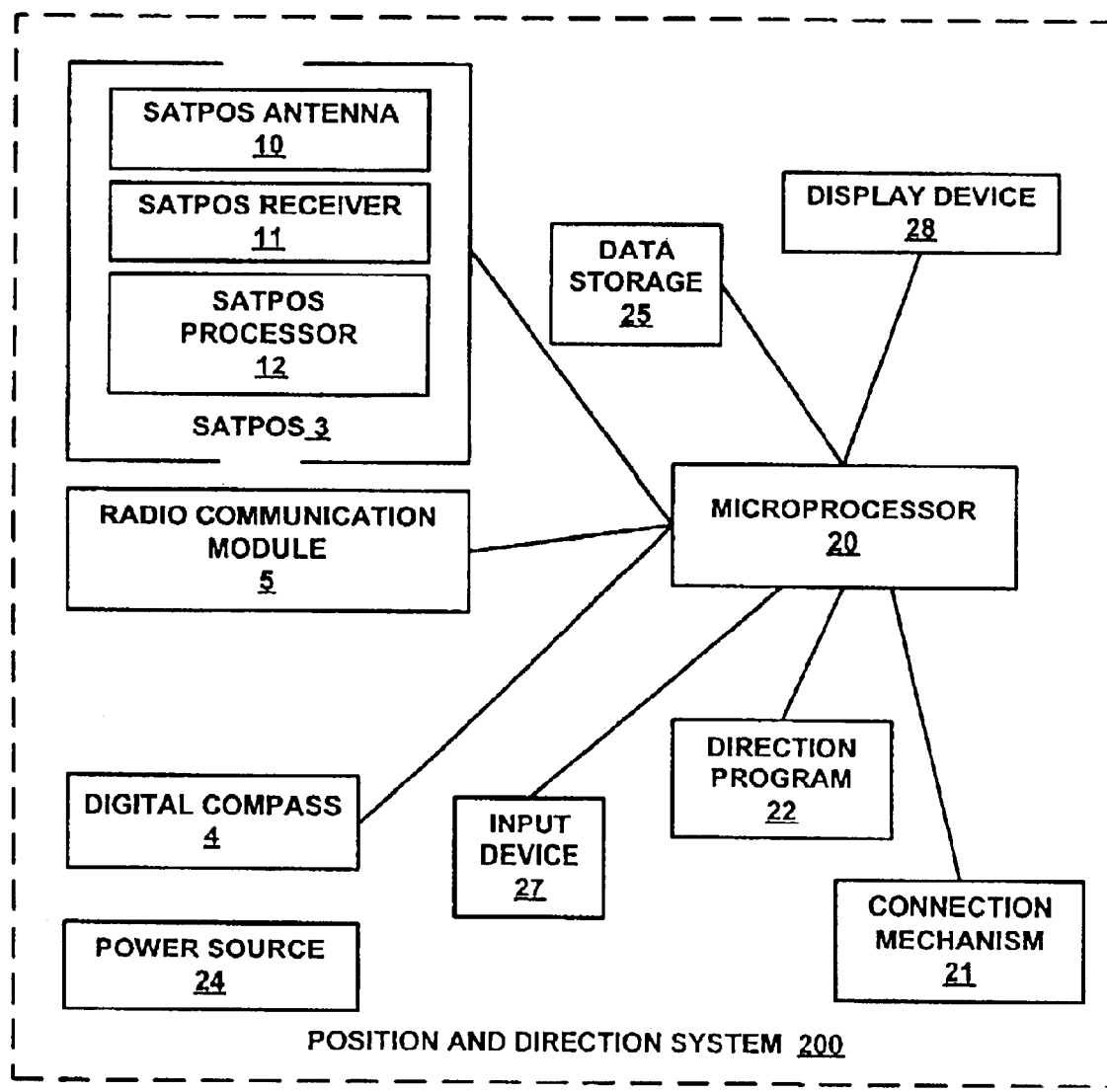
FIG. 2 is a diagram of an embodiment of the position and direction system of FIG. 1 in accordance with one embodiment of the present claimed invention.
Figure 3:
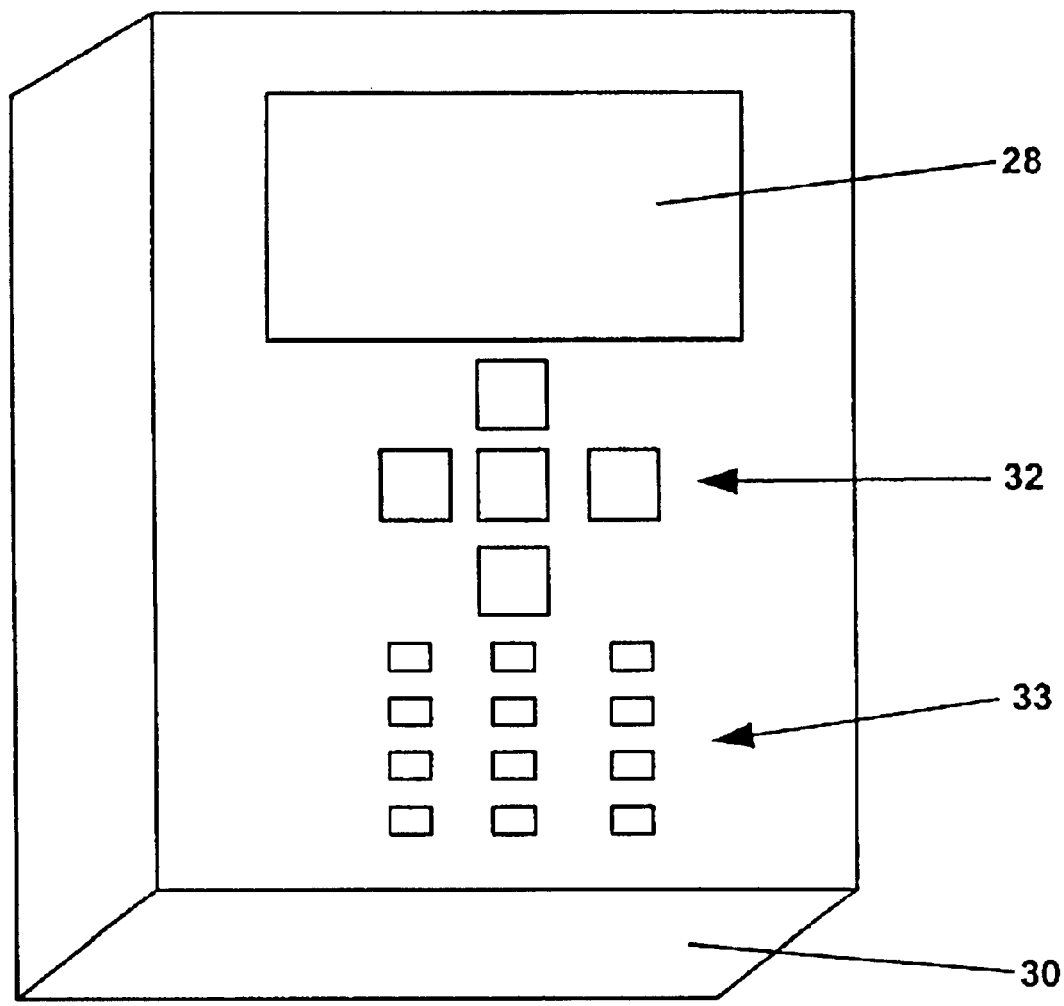
FIG. 3 is a perspective view of an embodiment of the position and direction system of FIG. 2 in accordance with one embodiment of the present claimed invention.

FIGS. 2–3 show an embodiment of the present invention that is incorporated into a handheld portable housing. That is, the housing is small enough to fit into a user's hand.

Referring now to FIG. 2, integrated position and direction system 200 is shown to include SATPOS 3 that is operable for determining position. In the present embodiment, SATPOS 3 includes SATPOS antenna 10, SATPOS receiver 11, and SATPOS processor 12. In one embodiment, SATPOS processor 12 is a GPS processor made by Trimble Navigation, Ltd. of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

Referring still to FIG. 2, microprocessor 20, in conjunction with direction program 22 perform the functions of controller 1 of FIG. 1. That is, in the present embodiment, direction program 22, operable on microprocessor 20 controls the operations of integrated position and direction system 200. In the present embodiment, microprocessor 20 is a general-purpose microprocessor that has low power consumption such as, for example, a Motorola RISC microprocessor made by Motorola Inc., of Austin, Tex. Alternatively, other types of processors, an ASIC device or a FPGA device can be used.

Continuing with FIG. 2, power source 24 provides power to the various components of integrated position and direction system 200. Power source 24 may be any suitable power source that is light-weight and compact such as, for example, built-in rechargeable batteries, AA batteries or AAA batteries.

Data storage device 25 is coupled to controller 20 and is adapted to store data. Data that can be stored in data storage device 25 includes, for example, an operating software program such as direction program 22. Data storage device 25 may be any type of digital data storage medium. In one embodiment, data storage device 25 is a Random Access Memory (RAM) device such as, for example, a Static Random Access Memory (SRAM) device, a Dynamic Random Access Memory (DRAM) device. Alternatively, other types of memory storage devices such as flash memory, tape, CD ROM, or DVD may be used.

Referring still to FIG. 2, connection mechanism 21 is coupled to microprocessor 20 and is adapted to connect to external devices such as, for example external computers. This allows for easily and quickly downloading new programs for operation on microprocessor 20 and allows for updating direction program 22. In one embodiment, connection mechanism 21 is a connector that complies with the RS-232 standard.

With reference again to FIG. 2, display device 28 is also electrically coupled to microprocessor 20. In one embodiment, display device 20 is an active matrix liquid crystal display. Alternatively a cathode ray tube, or other display device suitable for creating graphic images and alphanumeric characters recognizable to the user can be used.

Input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

Referring now to FIG. 3, an embodiment of position and direction system 200 is shown that is incorporated into housing 30 that is small enough to hold in a user's hand. In the present embodiment, function keys 32 and alphanumeric keypad 33 allow for coupling user input to position and direction system 200. In one embodiment, one or more of function keys 32 operates as a cursor control device. That is, one or more of function keys 32 allows the computer user to dynamically signal the two-dimensional movement of a visible symbol (cursor) on the display screen of display device 28.

Figure 4:
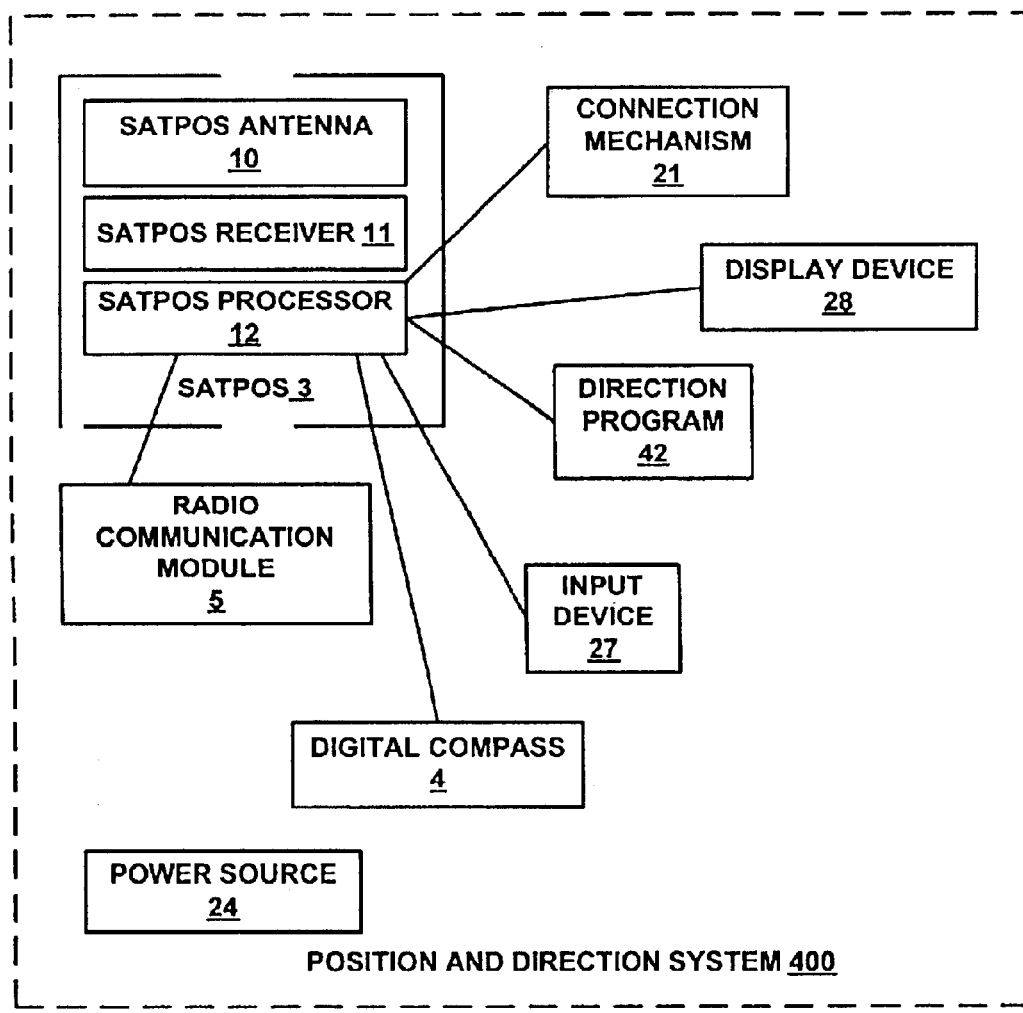
FIG. 4 is a diagram of a position and direction system in accordance with one embodiment of the present claimed invention.

FIG. 4 shows an embodiment of the present invention in which SATPOS processor 12 is used for controlling the operations of the integrated position and direction system 400. Because SATPOS processor 12 is used for controlling the operations of integrated position and direction system 400, there is no need for a second microprocessor such as microprocessor 20 of FIG. 2.

In the embodiment shown in FIG. 4, SATPOS processor 12 is operable to determine position and heading using SATPOS signals and is also operable to receive direction determined by digital compass 4. In this embodiment, SATPOS processor 12 includes instructions for determining which source of direction signals (heading from SATPOS signals or direction determined by digital compass 4) is to be indicated (e.g., displayed) on display device 28. In the present embodiment, these instructions are contained in direction program 42 that controls the operations of integrated position and direction system 400. Direction program 42 is a computer program that is operable on SATPOS processor 12. However, alternatively, instructions necessary for the operation of integrated position and direction system 400 can be implemented on an ASIC, a FPGA, or similar device.

In the present embodiment, position is indicated on display device 28. In one embodiment, position is indicated alphanumerically using latitude and longitude. Alternatively, position is indicated by an icon displayed on a moving map display.

In the present embodiment, reference to a satellite position determination system, or "SATPOS" herein refers to a Global Positioning System (GPS), to a Global Orbiting Satellite System (GLONASS), and to any other positioning system, including pseudolites, that provide signals that can be used to determine position. The term "satellite position determination system" and "SATPOS" as used herein, is intended to include position determination using pseudolites or equivalents of pseudolites, and the term "satellite position determination system signals" and "SATPOS signals," as used herein, is intended to include position determination system-like signals and data from pseudolites or equivalents of pseudolites. Also, signals from other sources such as LORAN, Wide Area Augmentation System (WAAS) satellites, etc. may be used to determine position.

In the embodiments shown in FIGS. 1–4, digital compass 4 is used to determine direction. In the present embodiment, digital compass 4 is a compass that determines direction by detection of electromagnetic flux. In the present embodiment, digital compass 4 is a magnetic field sensor made by Honeywell, Inc. Any of a number of different types of commercially available digital compasses can be used.

The embodiments of FIGS. 1–4 include radio communication module 5 which provides for communication between the position and direction system of the present invention and remote devices. In the present embodiment, radio communication module 5 is a radio modem that provides for communication using a cellular communication system (e.g., a cellular telephone communication system). However, radio communication module 5 is well adapted for communication using other communication systems that allow for wireless communication, including communication systems that provide for communication using radio transceivers, radio telephones, etc. Communication can be exclusively via wireless or using a combination of wireless and conventional wired communication methods (e.g., Plain Old Telephone Service (POTS) land lines or fiber optic lines).

Figure 11:
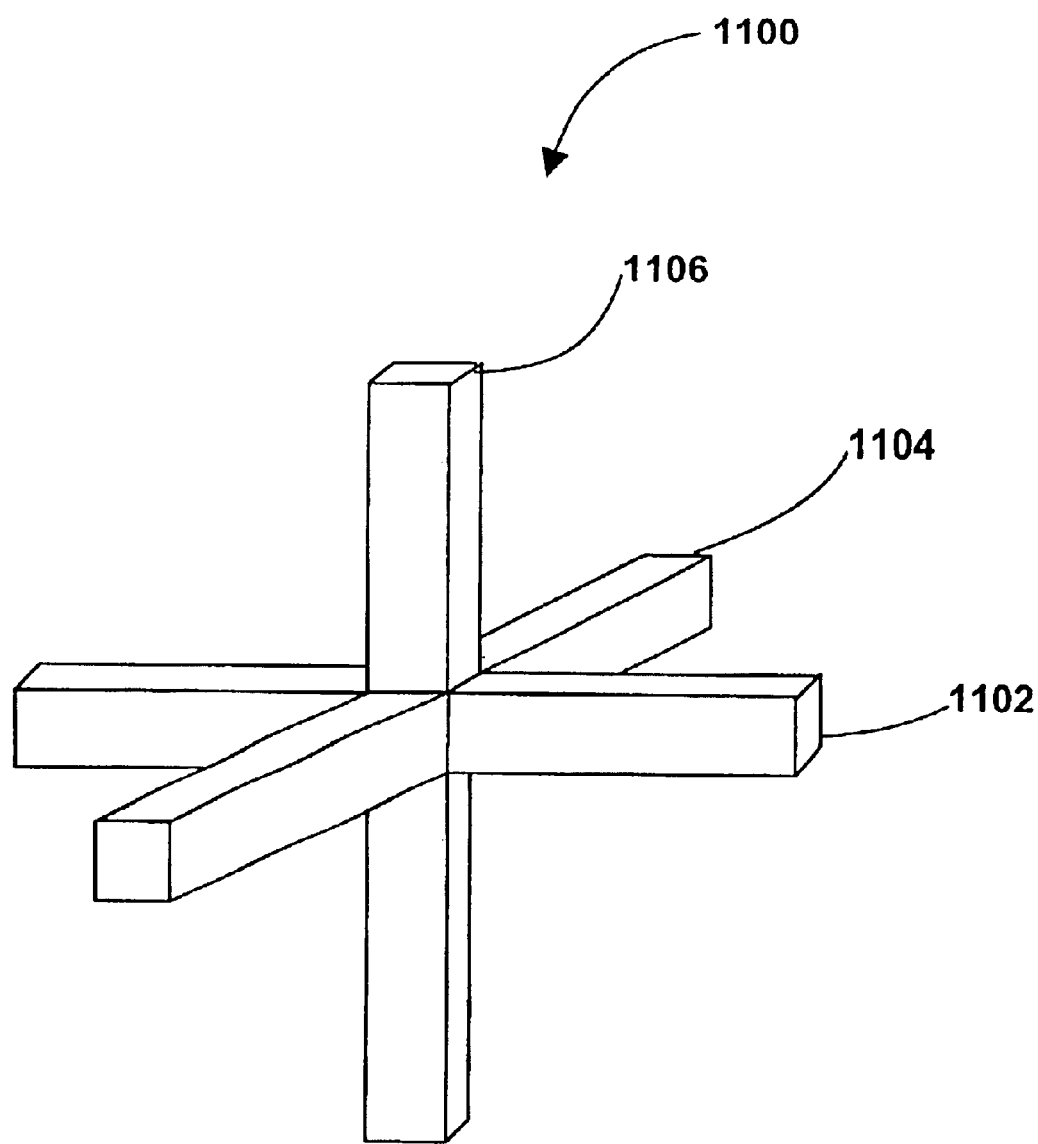
FIG. 11 is a schematic representation of an exemplary configuration for a 3-Sensor magnetic sensor in accordance with one embodiment of the present claimed invention.

Referring now to FIG. 11, a schematic representation of a magnetic field sensor 1100 in accordance with one embodiment of the present invention is shown. In this embodiment, magnetic field sensor 1100 is comprised, in part, of three sensors 1102, 1104, and 1106. By having three sensors, magnetic field sensor 1100 is able to determine the elevation angle of integrated position and direction system 100 of FIG. 1. More specifically, in one embodiment, sensors 1102 (x-direction sensor) and 1104 (y-direction sensor) determine the azimuthal orientation of integrated position and direction system 100. However, the determination of azimuthal orientation will determined with the assumption that integrated position and direction system 100 is held level. Thus, if, for example, a user of integrated position and direction system 100 is walking up a steep hill; walking down a steep hill; holding the integrated position and direction system 100 in a vertically oriented manner; and the like, the accuracy of the determined azimuthal orientation may be severely compromised. By using magnetic field sensor 1100 which includes sensor 1106 (z-direction sensor), the present embodiment is able to correctly determine the azimuthal orientation of integrated position and direction system 100 by correcting for any variation from horizontal in the position of integrated position and direction system 100. That is, sensor 1106 of the present embodiment determines the variance in integrated position and direction system 100 from a truly horizontal position. It will be understood that in the representation of FIG. 11, when integrated position and direction system 100 is at a truly horizontal position, sensor 1106 will be vertically oriented. Although a specific schematic implementation is shown in FIG. 11, the present invention is well suited to use with any of a number of different types of commercially available digital compasses which compensate for variations from a horizontal orientation.

Referring still to FIG. 11, in one embodiment, in addition to correcting the determined azimuthal orientation of integrated position and direction system 100 for variance from a truly horizontal orientation, the present invention also determines (and optionally displays) the elevation angle of integrated position and direction system 100. In such an embodiment, the user is made aware not only of the accurate azimuthal orientation (i.e. the direction in which integrated position and direction system 100 is pointed), but the user is also informed of the elevation angle at which integrated position and direction system 100 is oriented. Hence, the user can determine, for example, the slope of a hill by holding integrated position and direction system 100 parallel to the surface of the hill and reading the determined elevation angle. Additionally, although magnetic field sensor 1100 is comprised, in part, of three orthogonally oriented sensors 1102, 1104, and 1106 in the present embodiment, the present invention is also well suited to an embodiment in which more than three sensors are used and to an embodiment in which the plurality of sensors are arranged other than orthogonally.

Figure 5:
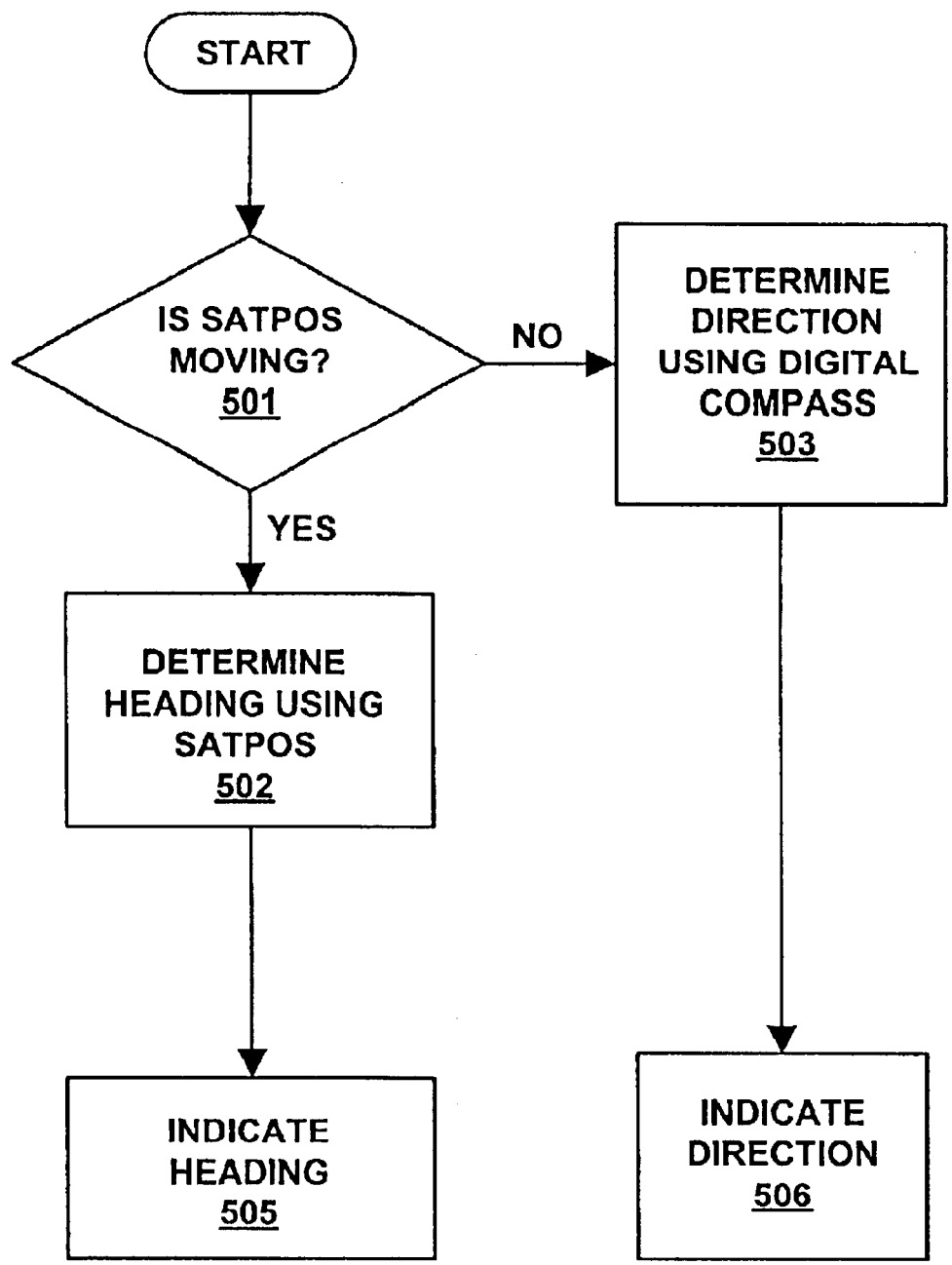
FIG. 5 is a flow chart illustrating a method for indicating direction and heading in accordance with one embodiment of the present claimed invention.

FIG. 5 shows a method for indicating direction and heading according to one embodiment of the present invention. As shown by steps 501–502, when the SATPOS is moving, heading is determined using the SATPOS. In the present embodiment, a satellite positioning system including a receiver adapted to receive satellite position determining signals such as, for example, SATPOS 3 of FIGS. 1–4 is used to both determine whether the SATPOS is moving and to determine heading.

In one embodiment of the present invention, the determination of whether the SATPOS is moving (step 501) is made by comparing the velocity of movement to a threshold velocity. In the present embodiment, prior determinations of position are compared to the most recent determination of position, along with the time of each determination of position to determine the velocity of movement of the SATPOS. When the velocity is determined to be greater than the threshold velocity, the SATPOS is considered to be moving.

As shown by step 505 of FIG. 5, when the SATPOS is moving, heading is indicated using the heading determined in step 502. In the embodiment shown in FIG. 1, display device 2 is used to indicate heading; and in the embodiment shown in FIGS. 2–3, display device 28 is used to indicate heading.

Still referring to FIG. 5, when the SATPOS is not moving, as shown by steps 501 and 503, direction is determined using the digital compass. In the present embodiment digital compass 4 of FIGS. 1–4 is used for determining direction.

As shown by step 506 of FIG. 5, when the SATPOS is not moving, direction is indicated using the direction determined by the digital compass in step 503. In the embodiment shown in FIG. 1, display device 2 is used to indicate direction; and in the embodiment shown in FIGS. 2–3, display device 28 is used to indicate direction.

The indications of direction and heading steps 505–506 can take any of a number of different forms. In one embodiment, heading and direction are indicated using a displayed compass rose. That is, icons representing a compass rose are displayed on, for example, display device 2 of FIG. 1 or display device 28 of FIGS. 2–3.

Figure 6A:
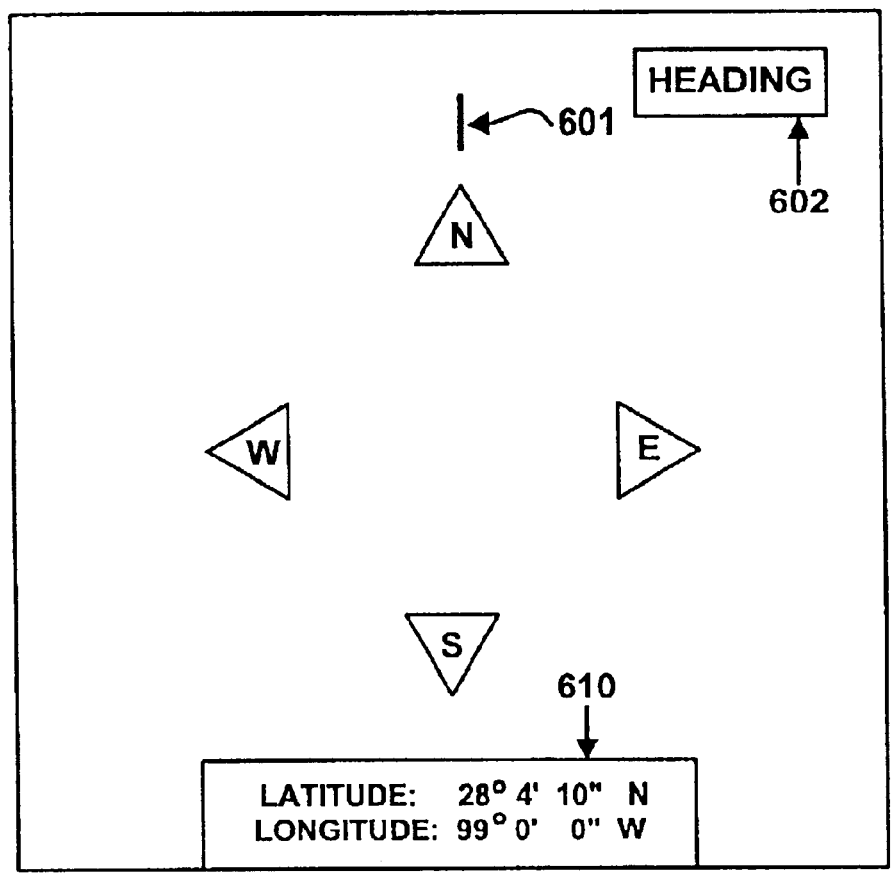
FIG. 6A is a diagram showing an exemplary display that indicates position and heading in accordance with one embodiment of the present claimed invention.
Figure 6B:
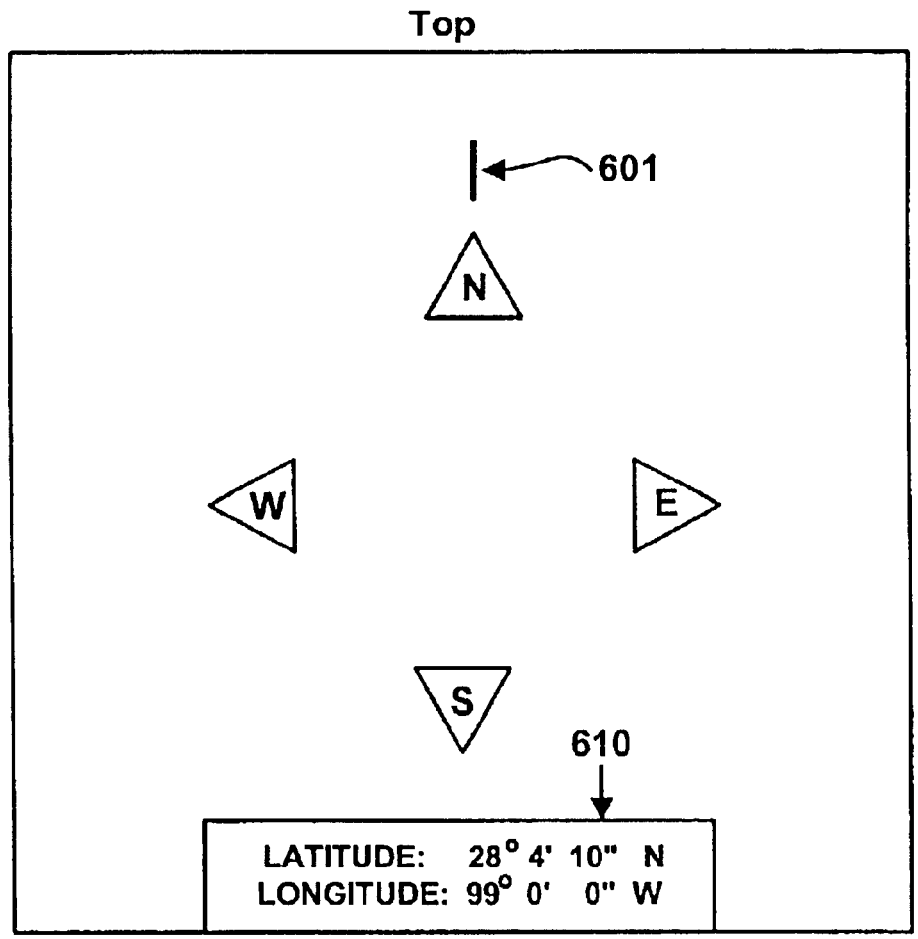
FIG. 6B is a diagram showing an exemplary display that indicates position and direction in accordance with one embodiment of the present claimed invention.

In one embodiment of the present invention the direction and heading indicated in steps 505–506 are indicated using a four-point compass rose. That is, direction is indicated relative to the compass points of North(N), South(S), East (E), and West(W). FIGS. 6a–6b show exemplary displays 600a–600b that include a four-point compass rose that can be used to indicate either heading (step 505 of FIG. 5) or direction (step 506 of FIG. 5).

Referring now to FIGS. 6a–6b, in the present embodiment, an icon is used to indicate whether heading is being displayed or whether direction is being displayed. More particularly, in display 600a of FIG. 6a, icon 602 is displayed to indicate to the user that heading is being displayed. Referring now to FIG. 6B, display 600b indicates that direction is being displayed. That is, the absence of icon 602 of FIG. 6A indicates that the digital compass is being used and that direction is being displayed.

In the embodiments shown in FIGS. 6A–6B, the compass rose is displayed such that direction and heading are indicated relative to alignment mark 601. That is, the compass rose is rotated such that the proper direction or heading is always indicated by reference to alignment mark 601. Thus, in the embodiment shown in FIG. 6A, because the compass point of N is aligned with alignment mark 601, display 600a indicates that the SATPOS has a heading directly to the North. Similarly, in the embodiment shown in FIG. 6B, because the compass point of N is aligned with alignment mark 601, display 600b indicates a North direction. That is, the SATPOS is oriented such that alignment mark 601 is pointing directly to the North.

Figure 7A:
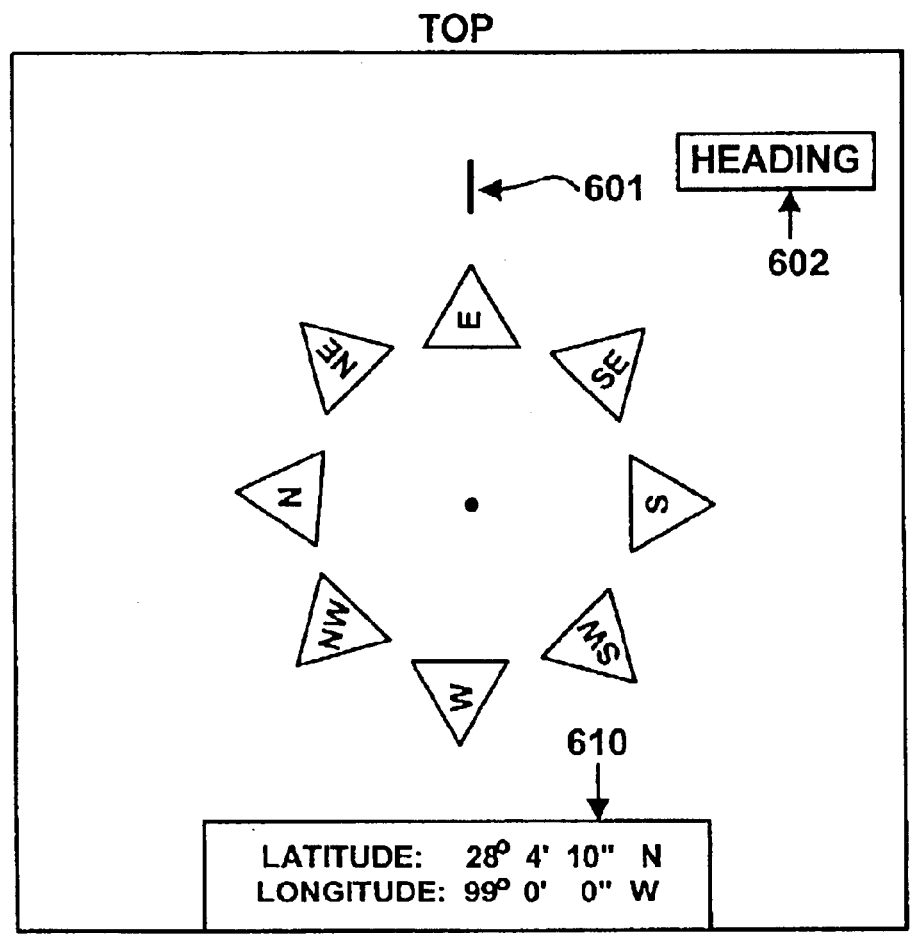
FIG. 7A is a diagram showing an exemplary display that indicates position and heading in accordance with one embodiment of the present claimed invention.
Figure 7B:
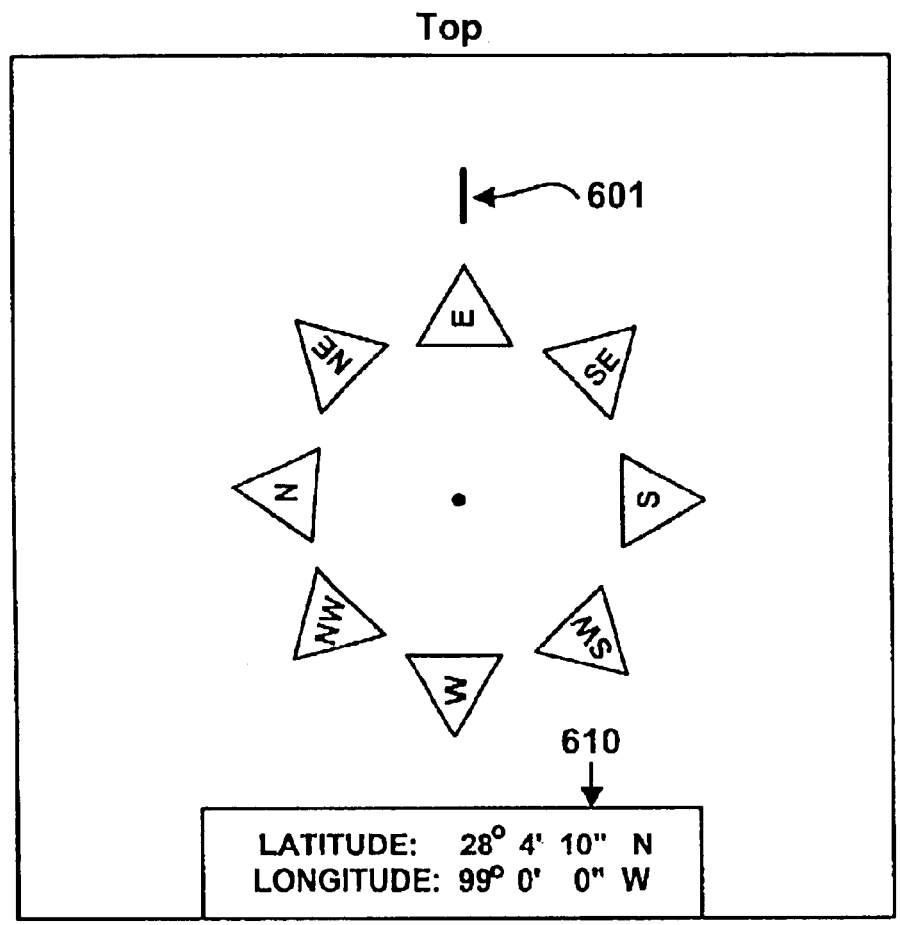
FIG. 7B is a diagram showing an exemplary display that indicates position and direction in accordance with one embodiment of the present claimed invention.

FIGS. 7A–7B shown an embodiment in which direction and heading are indicated using an eight-point compass rose. That is, direction and heading are indicated relative to the compass points of North(N), South(S), East(E), West(W), North East(NE), South East(SE), South West(SW), and North West(NW).

Referring now to FIGS. 7A–7B, exemplary displays 700a and 700b are shown to include an eight-point compass rose that can be used to indicate either heading (step 505 of FIG. 5) or direction (step 506 of FIG. 5). As in the embodiment shown in FIGS. 6A–6B, direction and heading are indicated relative to alignment mark 601 and icon 602 indicates whether direction or heading is being displayed.

In the embodiment shown in FIG. 7A, because the compass point of E is aligned with alignment mark 601, and because icon 602 is displayed, display 700a indicates that the SATPOS has a heading directly to the East. Similarly, in the embodiment shown in FIG. 7B, because the compass point of E is aligned with alignment mark 601, and because icon 602 is not displayed, display 700b indicates a East direction. That is, the SATPOS is oriented such that the top of the display, as indicated by alignment mark 601, is pointing directly to the East.

Figure 8A:
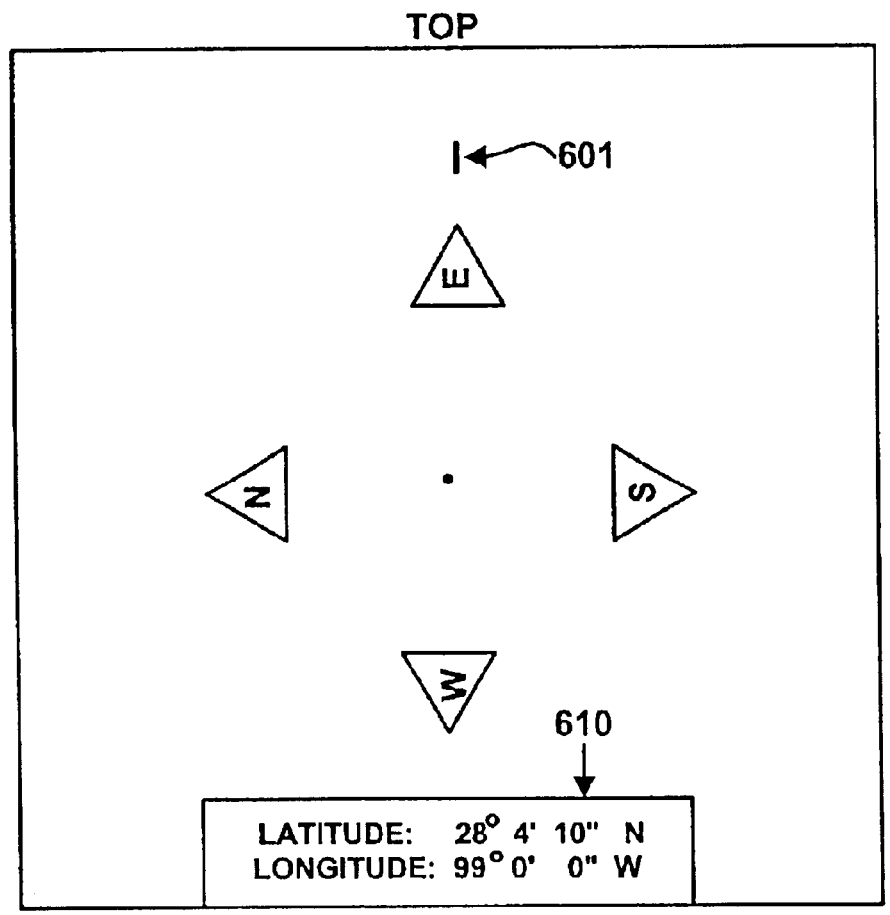
FIG. 8A is a diagram showing an exemplary display that indicates position and heading in accordance with one embodiment of the present claimed invention.
Figure 8B:
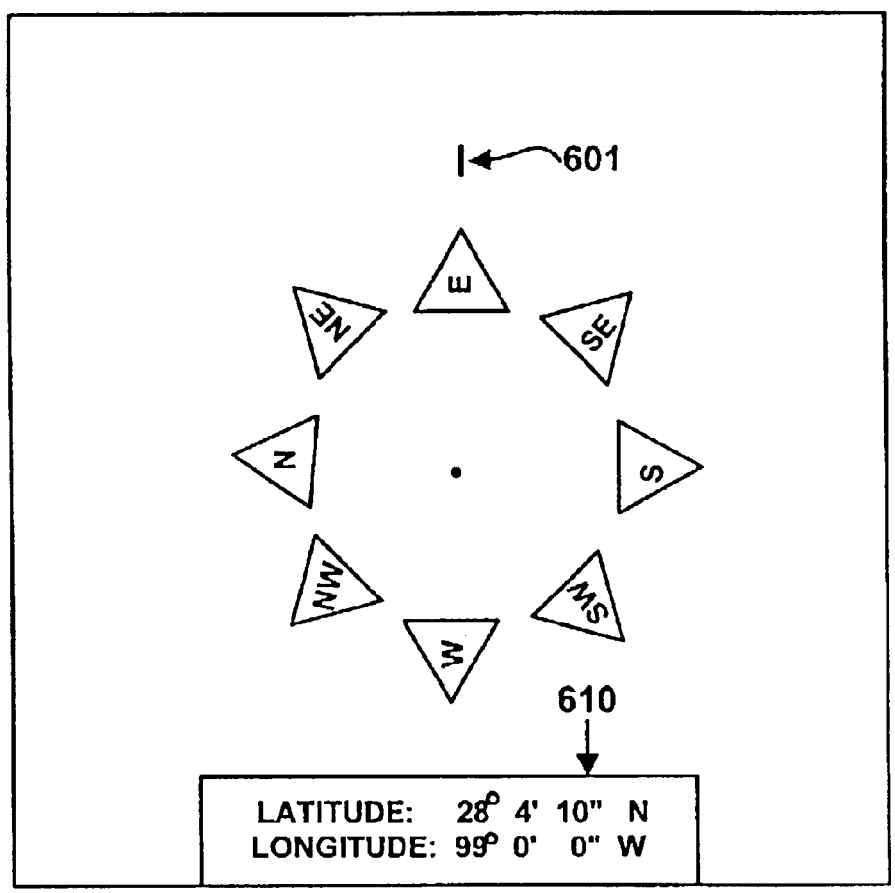
FIG. 8B is a diagram showing an exemplary display that indicates position and direction in accordance with one embodiment of the present claimed invention.

FIGS. 8A–8B show an embodiment in which both a four point compass rose and an eight-point compass rose are used. In the present embodiment, the display of a four-point compass rose indicates that heading (step 505 of FIG. 5) is being displayed while the display of an eight-point compass rose indicates that direction (step 506 of FIG. 5) is being displayed. In the embodiment shown in FIGS. 8A–8B, direction and heading are indicated relative to the top of the display, as indicated by alignment mark 601.

Now referring to display 800a of FIG. 8A, because the compass point of E is aligned with alignment mark 601, and because a four-point compass rose is displayed, display 800a indicates that the SATPOS has a heading directly to the East. Similarly, in the embodiment shown in FIG. 8B, because the compass point of E is aligned with alignment mark 601, and because an eight-point compass rose is displayed, display 800b indicates a East direction. That is, the SATPOS is oriented such that the top of the display, as indicated by alignment mark 601 is pointing in the cardinal direction of East.

The apparatus and method of the present invention automatically switches between displays of heading and direction as the SATPOS moves and stops moving. Thus, the method and apparatus of the present invention provide an uninterrupted display that can be used to find features, waypoints, etc. In the present embodiment, either heading or direction is continually displayed.

In the present embodiment, the determined position is also indicated. In the embodiment shown in FIGS. 6A–8B, position is indicated alphanumerically using latitude and longitude as shown by icon 610. Alternatively, position is indicated by an icon displayed on a moving map display.

Figure 9A:
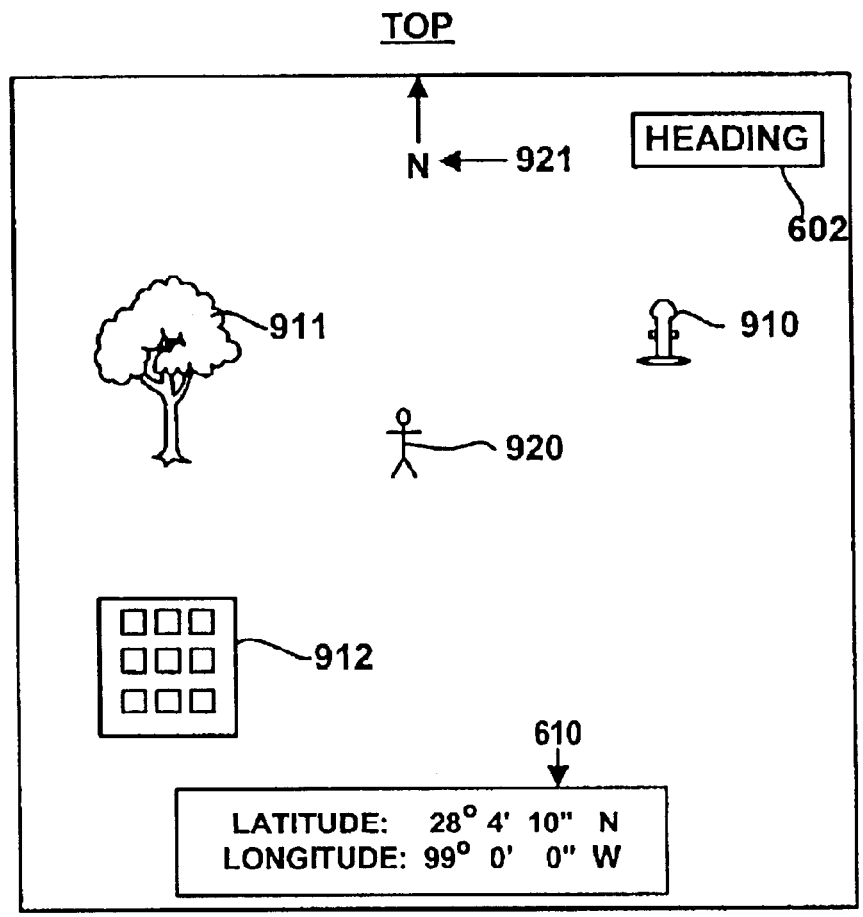
FIG. 9A is a diagram showing an exemplary display that indicates position and heading in accordance with one embodiment of the present claimed invention.
Figure 9B:
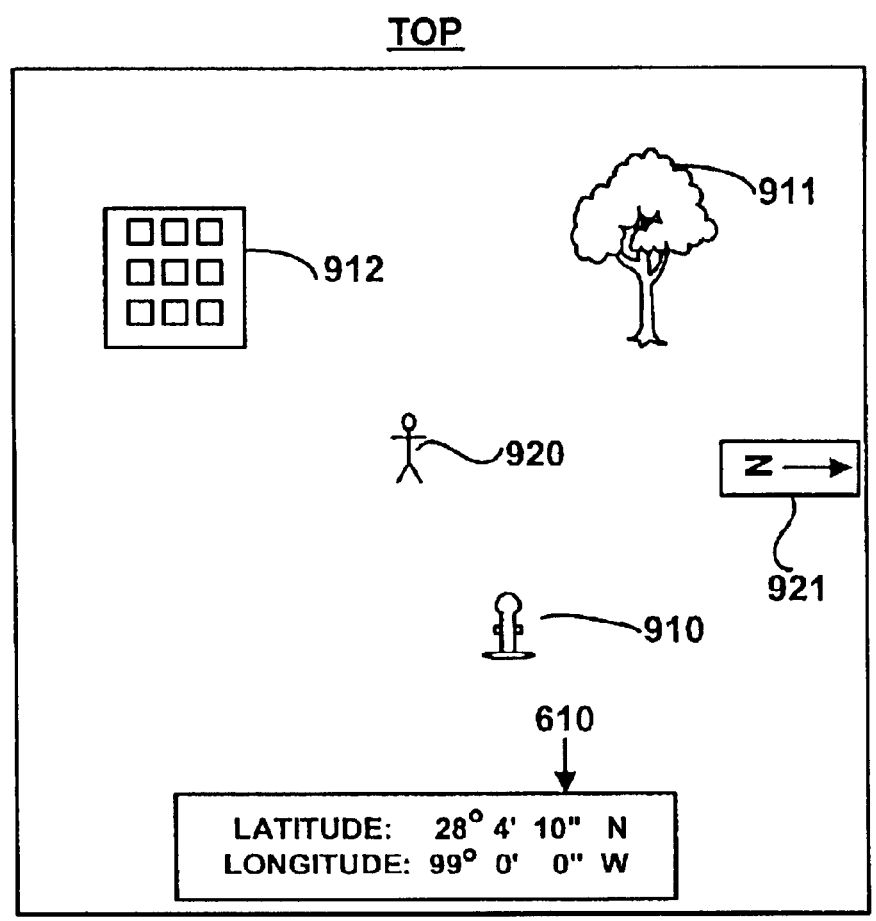
FIG. 9B is a diagram showing an exemplary display that indicates position and direction in accordance with one embodiment of the present claimed invention.

In one embodiment of the present invention, position, direction and heading are indicated using a moving map display. FIGS. 9A–9B shows an exemplary display 900 that includes position icon 920 that indicates the position of the SATPOS relative to icons 910–912 that represent features. In the present embodiment, icon 910 indicates the position of a feature that is a fire hydrant, icon 911 indicates the position of a feature that is a tree, and icon 912 indicates the position of a feature that is a building.

Referring now to FIGS. 9A–9B, exemplary displays 900a and 900b are shown to include position icon 920 that indicates the position of the SATPOS relative to features 910–912. As in the embodiment shown in FIGS. 6A–7B, an icon 602 is displayed to indicate whether direction or heading is being displayed. In the present embodiment, an icon 921 that indicates the direction of North is also displayed so that the user can determine the orientation of the moving map display.

Referring now to FIG. 9A, an exemplary display 900a is shown that indicates a heading of North. That is, because heading icon 602 is displayed, a display of heading is indicated (step 505 of FIG. 5). Because the map is oriented such that the North icon is pointed to the top of the display, the heading is indicated as being directly to the North.

Referring now to FIG. 9B, an exemplary display 900b is shown that indicates a direction of West. That is, because heading icon 602 is not displayed, a display of direction is indicated (step 506 of FIG. 5). Because the map is oriented such that the North icon is pointed to the right side of the display, the direction is indicated as being directly to the West. That is, the display is oriented such that the top of the display points in the cardinal direction of West.

The apparatus and method of the present invention automatically switches between displays of heading and direction as the SATPOS moves and stops moving. Thus, the method and apparatus of the present invention provide an uninterrupted display that can be used to find features such as, for example, features 910–912 of displays 900a–900b.

The present invention is well adapted for other indications of heading and direction other than those shown in FIGS. 6A–9B. In one embodiment, heading and/or direction are indicated using an indication of degrees from 0 to 360 degrees. That is, a number is displayed on the display device that indicates cardinal direction with 0 and 360 being North. That is, in the embodiment shown in FIG. 1, display device 2 displays a number from 0 to 360; and in the embodiment shown in FIGS. 2–3, display device 28 displays a number from 0 to 360.

The embodiments shown in FIGS. 1–9B of the present invention provide a method and apparatus for providing an accurate indication of direction and heading to a user of a SATPOS device. When the user is stationary, position is accurately indicated using a digital compass. When the user is moving, the direction of movement(heading) is accurately indicated. Because the integrated position and direction system of the present invention always indicates either heading or direction, the user is always able to locate features, waypoints, etc.

Prior art digital compasses are typically calibrated manually by rotating the digital compass in a circular arc. The digital compass of the present invention can be manually calibrated using this technique.

In one embodiment of the present invention the digital compass is automatically calibrated using the SATPOS determination of heading. In one embodiment of the present invention, the digital compass is automatically calibrated upon selection of an icon or button that indicates "Automatic Compass Calibration" when the position and direction system of the present invention is moving (e.g. when step 501 of FIG. 5 indicates that the SATPOS is moving).

In one embodiment of the present invention, the digital compass is automatically calibrated on a periodic basis, without any required input from the operator, when the SATPOS is moving. In one embodiment, the digital compass is automatically calibrated according to user selectable time periods. In the present embodiment, the user can select time periods of ten minutes, 30 minutes, one hour, four hours, or 12 hours. Thus, for example, when a user selects a time period of ten minutes, the digital compass is calibrated when the digital compass begins to move and every ten minutes thereafter until the digital compass stops moving. This provides for easily maintaining the accuracy of the digital compass.

In the present embodiment, the digital compass is calibrated by determining heading using the SATPOS, and adjusting the direction indicated by the digital compass according to the heading determined by the satellite positioning system. In the embodiment shown in FIG. 1, controller 1 is operable to automatically calibrate the digital compass; in the embodiment shown in FIGS. 2–3, direction program 22 is operable to automatically calibrate the digital compass; and in the embodiment shown in FIG. 4, direction program 42 is operable to automatically calibrate the digital compass.

Figure 10:
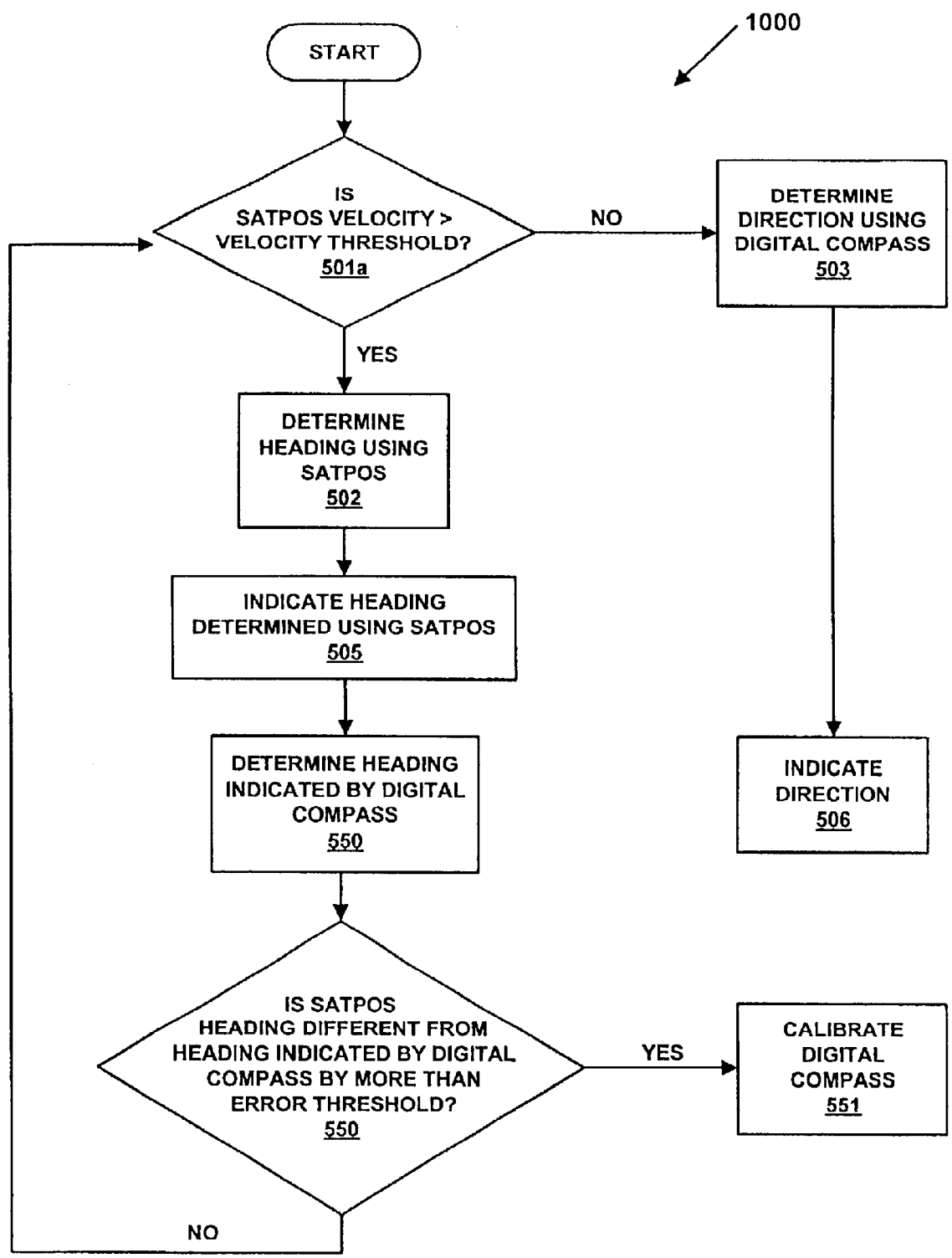
FIG. 10 is a flow chart illustrating a method for calibrating a digital compass in accordance with one embodiment of the present claimed invention.

FIG. 10 shows a method for calibrating a digital compass 1000 in which a digital compass (e.g. digital compass 4 of FIGS. 1–4)is calibrated using a heading determined using a SATPOS (e.g., SATPOS 3 of FIGS. 1–4). Referring now to step 501a the velocity determined by the SATPOS is compared to a threshold velocity. If the velocity is not greater than the threshold velocity (steps 501a and 503), direction is determined using the digital compass (step 503), and direction is indicated as shown by step 506.

Continuing with FIG. 10, if the velocity is not greater than the threshold velocity, heading is determined using the SATPOS as shown by steps 501a and 502. The heading determined using the SATPOS is then indicated as shown by step 505.

Still referring to FIG. 10, as shown by step 550, the heading indicated by the digital compass is determined. In the embodiment shown in FIG. 1, controller 1 is operable to determine the heading indicated by the digital compass using input from digital compass 4; in the embodiment shown in FIGS. 2–3, direction program 22 is operable to determine the heading indicated by the digital compass; and in the embodiment shown in FIG. 4, direction program 42 is operable to determine the heading indicated by the digital compass.

The heading indicated by the digital compass is then compared to the heading determined using the SATPOS as shown by step 550. If the difference between the heading determined using the SATPOS and the heading indicated by the digital compass by more than a predetermined error threshold, the digital compass is calibrated as shown by steps 550–551. In one embodiment, a default error threshold of between one to two percent is initially used, which can be altered by the user at any time to accommodate the needs of that particular user. The present embodiment allows for the automatic calibration of the digital compass whenever the heading indicated by the digital compass significantly varies from the heading determined using the SATPOS.

As discussed above, the present invention provides for automatically calibrating a digital compass, either as a result of user input (e.g., selection of an icon, pressing of a button, etc.), or as a result of user-defined criteria for automatic calibration. That is, the user can program the present invention to automatically calibrate the digital compass (e.g. when velocity exceeds a given threshold, whenever the SATPOS begins moving, periodically while the SATPOS is moving, when the difference between the SATPOS determined heading differs from the heading indicated by the digital compass by more than a predetermined threshold, etc. The integrated position and direction system of the present invention is easy to use since there in no need for a user to manually calibrate the digital compass.

Though the embodiments shown in FIGS. 1–9B describe the indication of either direction or heading, the present invention is well adapted for display of both direction and heading when the SATPOS is moving.

Figure 12:
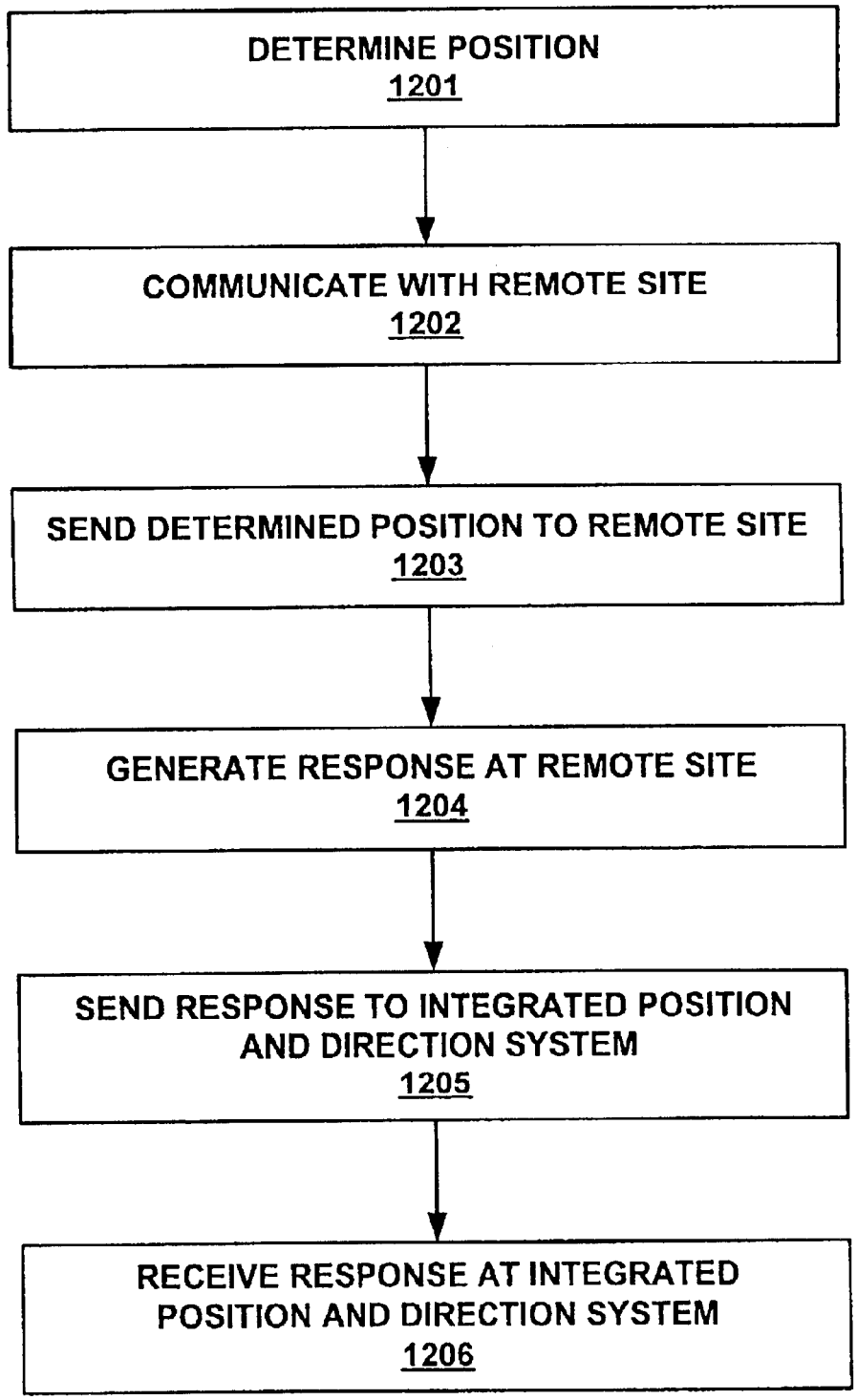
FIG. 12 is a flow chart illustrating a method for providing a data update to data stored in a position and direction system in accordance with one embodiment of the present claimed invention.

Referring now to FIG. 12, a method 1200 for providing data updates is shown in which updates are provided to data stored within an integrated position and direction system. Referring now to step 1201, position is determined using signals from satellites. In the present embodiment, SATPOS 3 of FIGS. 1–2 is used to determine position.

Referring now to step 1202 the integrated position and direction system communicates with a remote site. In the present embodiment, radio communication module 5 of FIGS. 1–4 is used to communicate with a remote site.

Figure 14:
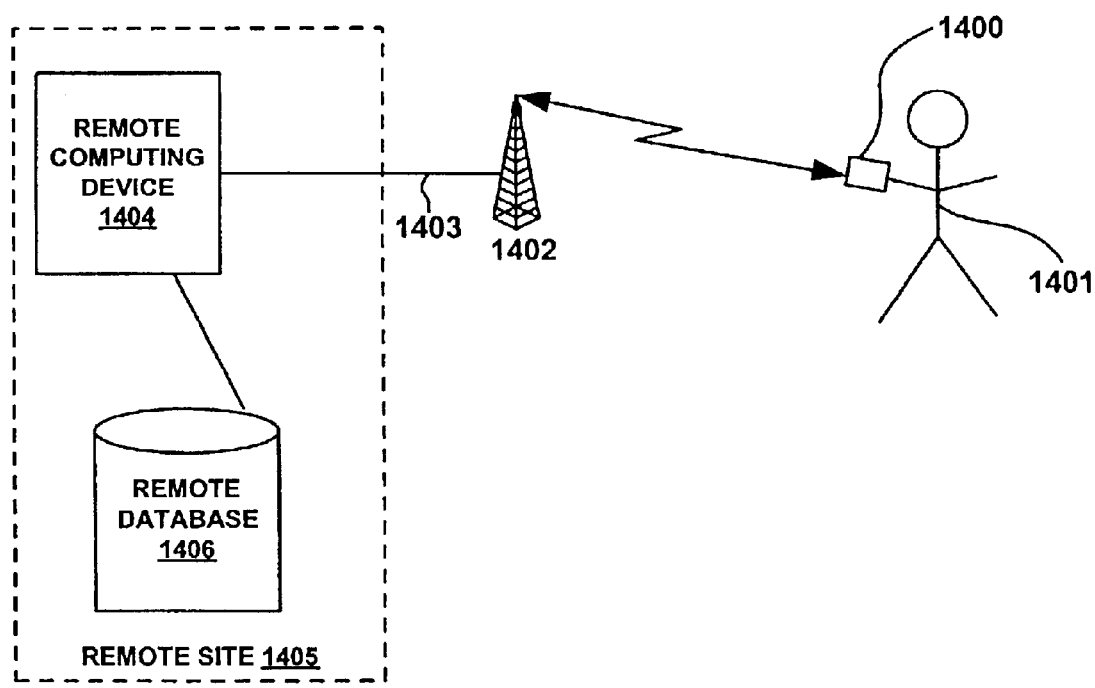
FIG. 14 is a diagram showing an exemplary representation of a position and direction system communicating with a remote site in accordance with one embodiment of the present claimed invention.

In the embodiment shown in FIG. 14, communication with a remote site is accomplished using a cellular radio transmission system that includes cellular tower 1402 and land lines 1403. In this embodiment, user 1401 is shown to be holding integrated position and direction system 1400 which is communicating with remote site 1405 via a wireless communication link with cellular tower 1402 and land lines 1403 (e.g., POTS land lines). Communication between integrated position and direction system 1400 and cellular tower 1402 is accomplished using a radio transceiver. In the present embodiment, a cellular radio modem, a radio telephone, or other device capable of transmitting radio signals is used to communicate via radio with cellular tower 1402. The signals are then transmitted via land lines 1403 to remote computing device 1404 located at remote site 1405. Remote computing device 1204 can be any device capable of processing information such as, for example, a personal computer, a portable computer, a server, etc.

Referring to step 1204 of FIG. 12, a response is generated at the remote site. In the present embodiment, the response includes data that relates to the determined position (e.g., information for generating a display of features located near the determined position). In the embodiment shown in FIG. 14, the determined position is used to query remote database 1406 which is coupled to remote computing device 1404. This query produces data that relates to the determined position.

As shown by step 1205, the response is sent to the integrated position and direction system. In the embodiment shown in FIG. 14, the response generated by remote computing device 1404 is transmitted via land line 1403 and cellular tower 1402 to integrated position and direction system 1400.

As shown by step 1206, the response is received by the integrated position and direction system. In the embodiment shown in FIG. 14, the response is received by integrated position and direction system 1400. The data that relates to the determined position is then stored in data storage of the integrated position and direction system (e.g., data storage 25 of FIG. 2).

The methods of steps 1201–1206 provide for downloading data to an integrated position and direction system that includes information relating to the determined position of the integrated position and direction system. In the present embodiment, the downloaded data is used to generate a display that includes icons representing nearby features and that indicates the position of the integrated position and direction system relative to the features. In the present embodiment, the icons are oriented relative to either the direction of movement of the integrated position and direction system or the orientation of the integrated position and direction system so that the display accurately indicates the position and orientation of the features relative to the integrated position and direction system (e.g., icons 910–912 shown in FIG. 9A). In the present embodiment, either digital compass 4 or SATPOS 3 of FIGS. 1–4 is used for determining orientation of the features relative to the integrated position and direction system.

The process of updating information (steps 1201–1206 is repeated as needed to keep the information on the display current. In one embodiment, position is periodically determined and updates are made upon significant changes to position. In one embodiment, updates are made when an integrated position and direction system moves within a certain distance from the outside boundaries of the most recently downloaded data. Thus, the integrated position and direction system of the present invention provides a moving map display to a user that is updated as required by the movement of integrated position and direction system.

In one embodiment, only data relating to features located near the determined position is downloaded. This information is then used to generate a display that indicates features located near the current position of the integrated position and direction system. Because only the information currently needed by the user (information relating to features near the determined position) is downloaded to, and stored on the integrated position and direction system there is no need to store an extensive database on the integrated position and direction system as is required by prior art systems.

Figure 13:
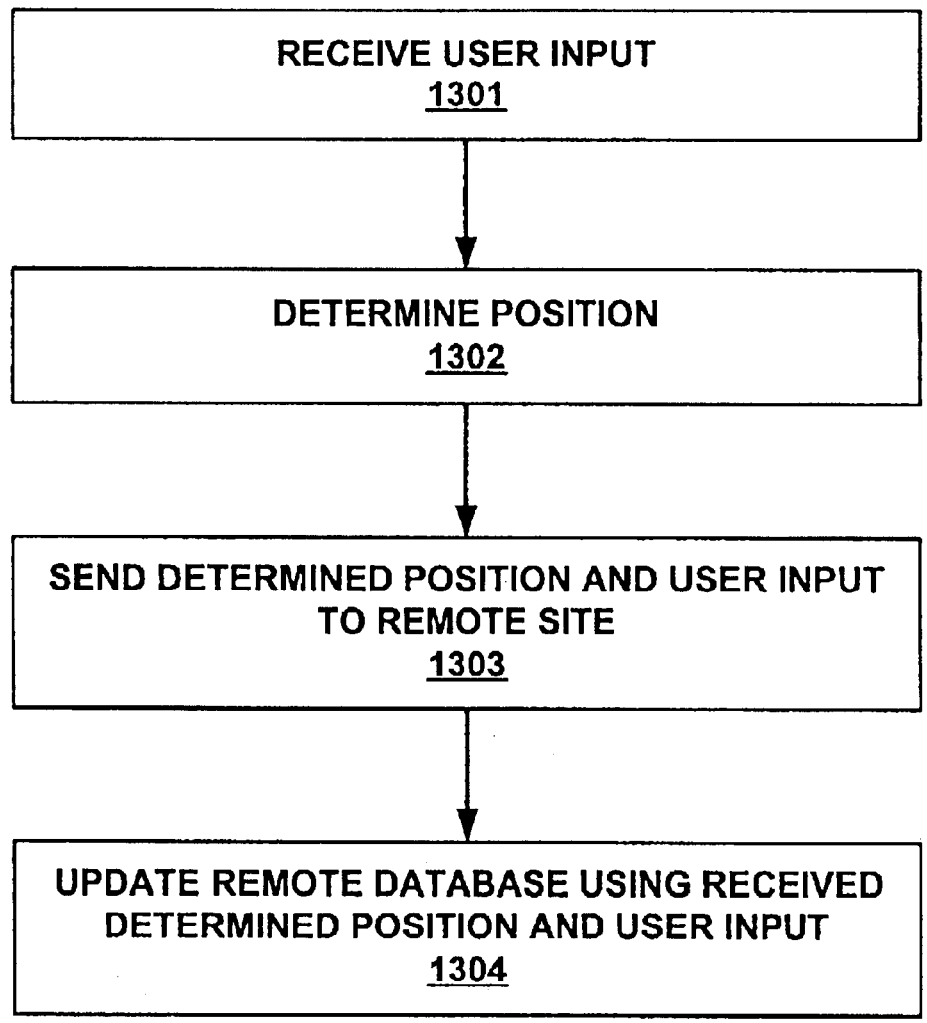
FIG. 13 is a flow chart illustrating a method for providing a data update to data stored in a remote database in accordance with one embodiment of the present claimed invention.

Referring now to FIG. 13, a method 1300 for providing data updates is shown in which updates are provided to data within a remote database. Referring now to step 1301, user input is received. In the present embodiment, user input is received via the operation of function keys 32 and/or the operation of the keys of alphanumeric keypad 33 of FIG. 2.

Continuing with step 1301, in one embodiment, steps 1201–1206 of FIG. 12 provide data to an integrated position and direction system that is used to generate a display that includes icons representing nearby features and that indicates the position and orientation of the features relative to the integrated position and direction system.

In the present embodiment, user input is facilitated by the use of icons that represent features of interest. The features of interest will vary, depending on the application (e.g., a GIS application or a data maintenance application) and the information required for that particular application. In one embodiment, upon selection of an icon, a pop-up menu appears that presents status options (e.g., needs painted, plug loose, leaking, flooding) that relate to the selected feature. The operator then selects an appropriate status. For example, if a user sees that a fire hydrant that is in front of him and to his right is leaking, the user finds and selects the corresponding icon on the display. Thus, in the embodiment shown in FIG. 9A, the user would select icon 910 that represents a fire hydrant. For example if the fire hydrant is leaking, the status option "leaking" is selected.

Position is then determined as shown by step 1302. In the present embodiment, satellite positioning system 3 of FIGS. 1–4 is used for determining position. Because position is determined immediately after the receipt of user input (step 1301), the determined position corresponds to the position at which the user input was received.

Referring now to step 1303, the user input received in step 1301 and the position determined in step 1302 are sent to a remote site. In the present embodiment, communication is automatically initiated by the integrated position and direction system using a cellular radio modem, a radio telephone or other device capable of transmitting radio signals. In the embodiment shown in FIG. 4, radio communication module 5 is operable for communicating with a remote site. In the embodiment shown in FIG. 14, integrated position and direction system 1400 communicates with remote computing device 1404 located at remote site 1405 via radio transmission to cellular tower 1402 and transmission through land lines 1403.

Continuing with FIG. 13, in one embodiment, all events of user input (step 1301) automatically cause the integrated position and direction system to initiate communication with the remote site (step 1303). Alternatively, the integrated position and directions system periodically sends database updates. In yet another embodiment, a priority is associated with certain status options. When status options having a low priority are selected, the information is stored for later transmission. However, when status options having a high priority are selected, the integrated position and direction system automatically and immediately initiates communication for sending the status to the remote site. For example, if an icon that represents a fire hydrant is selected and the user inputs a status that has a high priority such as a status of "flooding," communication is immediately initiated to communicate the indicated status.

Referring now to step 1304 of FIG. 13, the remote database is updated using the received determined position and using the received user input. In the embodiment shown in FIG. 14, remote computing device 1404 is operable to update database 1404 using the received determined position and using the received user input.

In the present embodiment, the received user input is associated with the received position in order to determine the exact physical feature or features to which the user input relates. In the present embodiment, remote computing device 1404 associates the user input and the received position to determine the exact physical feature(s) to which the user input relates. However, alternatively, this association could be performed at the integrated position and direction system and information identifying the exact physical feature could be transmitted along with the user input (e.g. an identification number).

The methods and apparatus of the present invention are well adapted for Graphical Information System (GIS) applications, database maintenance applications, etc. In one embodiment of the present invention, steps 1201–1206 provide data to an integrated position and direction system that is used to generate a display that includes icons representing nearby features and that indicates the position and orientation of the features relative to the integrated position and direction system. Updates to the GIS database are performed according to steps 1301–1304 of FIG. 13.

The methods and apparatus of the present invention provide for easily updating data (both data stored on the integrated position and direction system and data stored in a remote database) using a radio communication module that communicates with the remote site. The apparatus and methods of the present invention do not require that extensive databases be stored on the integrated position and direction system. Instead, only the information currently needed by the user (information relating to features near the determined position) is downloaded to, and stored on the integrated position and direction system. In addition, because the display indicates the correct orientation of features, the features are easy to find.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A position system comprising:
   a) a satellite positioning system including a receiver adapted to receive satellite position determining signals and a microprocessor for determining position;
   b) an interface adapted to receive information related to the determined position;
   c) a radio communication module coupled to said satellite positioning system and said interface, said radio communication module adapted to transmit the determined position and the information related to the determined position;
   d) a display device; and
   e) logic coupled to said display device and said interface and operable to cause said display device to display selectable icons representing nearby features relative to said position system.

2. The position system as recited in claim 1, wherein said logic is further operable to cause said display device to display user-selectable status related to said icons.

3. The position system as recited in claim 2, wherein said logic is further operable to transmit the determined position and the information related to the determined position at a time that is based on priority of a selected status of said user-selectable status related to said icons.

4. A position system comprising:
   a) satellite positioning system including a receiver adapted to receive satellite position determining signals and a microprocessor for determining position;
   b) an interface adapted to receive information related to the determined position;
   c) a radio communication module coupled to said satellite positioning system and said interface; and
   d) logic coupled to said radio communication module to identify a feature to which the information related to the determined position relates; and wherein;
   said radio communication module is adapted to transmit the determined position, the information related to the determined position, and an identifier of said feature.

5. A position system comprising:
   a) a satellite positioning system including a receiver adapted to receive satellite position determining signals and a microprocessor for determining position;
   b) an interface adapted to receive information related to the determined position;
   c) a radio communication module coupled to said satellite positioning system and said interface, said radio communication module adapted to transmit the determined position and the information related to the determined position, and wherein said radio communication module is further adapted to receive data relating to features near the determined position.

6. The position system as recited in claim 5, wherein said microprocessor is further for determining heading, and wherein the position system further comprises:
   d) a digital compass for determining direction; and
   e) a display device coupled to said satellite positioning system and the digital compass for generating a display that indicates position and orientation of said features near the determined position, said display oriented using one of said direction and said heading.

7. A system for updating information comprising:
  a mobile device comprising:
    a satellite positioning system including a receiver adapted to receive position determining signals from satellites, said satellite positioning system adapted to determine position;
    an interface adapted to receive user data; and
    a mobile radio communication module coupled to said satellite positioning system and to said interface, said mobile radio communication module adapted to transmit said user data and said position; and
  a remote computing device comprising:
    a database for storing information associated with a plurality of positions;
    a remote radio communication module coupled to said database, said remote radio communication module adapted to receive said user data and said position from said mobile device; and
    logic coupled to said remote radio communication module and to said database and to update said database based on the position and the user data.

8. The system of claim 7, wherein the mobile device further comprises:
  a display device; and
  a controller coupled to said display device and operable to cause the display device to display icons representing nearby features relative to said mobile device.

9. The system of claim 8, wherein said remote radio communication module is further adapted to transmit to the mobile device data related to the nearby features.

10. The system of claim 8, wherein the controller is further operable to cause the display device to display user-selectable status related to said icons.

11. The system of claim 10, wherein the mobile device further comprises:
  logic coupled to the remote radio communication module operable to transmit the user data and the position at a time that is based on priority of a selected status of the user-selectable status related to said icons.

12. The system of claim 7, wherein the mobile device further comprises:
  logic coupled to the satellite positioning system and the interface operable to associate the position and the user input to determine a physical feature related to the position.

13. The system of claim 7, wherein said remote radio communication module includes a cellular radio modem.

14. A method for updating data using a mobile position system that includes a satellite positioning system and a radio communication module, said method comprising:
  a) determining position near the mobile position system using said satellite positioning system;
  b) receiving, at the mobile position system, input related to said position;
  c) transmitting said determined position and said input via said radio communication module;
  d) receiving the transmitted input and the determined position at a remote computing device;
  e) updating data at said remote computing device based on said input and the determined position received in said d);
  f) receiving a response from said remote computing device, said response including data relating to features located near said determined position; and
  g) generating a display on said mobile position system, said display indicating the position of said features relative to said mobile position system.

15. A method for updating data using a mobile position system that includes a satellite positioning system and a radio communication module, said method comprising:
  a) determining position near the mobile position system using said satellite positioning system;
  b) receiving, at the mobile position system, input related to said position;
  c) transmitting said determined position and said input via said radio communication module;
  d) receiving the transmitted input and the determined position at a remote computing device;
  e) updating data at said remote computing device based on said input and the determined position received in said d);
  f1) displaying icons on a display of said mobile position system, said icons representing features located near said mobile position system;
  f2) receiving a selection of one of said icons; and
  f3) receiving a selection of status relating to a feature represented by said selected icon.

16. A method as recited in claim 15 further comprising:
  in response to said receiving status selection in said f3), said mobile position system automatically initiating communication with said remote computing device and automatically transmitting an indication of said selected status to said remote computing device.

17. A method as recited in claim 15, further comprising:
  in response to said receiving a selection of one of said icons in said f2), displaying a pop-up menu that includes a plurality of status options.

18. A method as recited in claim 15, further comprising:
  in response to said receiving a selection of a status in said f3):
    i) determining a priority associated with the selected status; and
    ii) initiating communication and transmitting an indication of said selected status option to said remote computing device based on said priority.

* * * * *